United States Patent [19]

Metcalf et al.

[11] Patent Number: 4,643,290
[45] Date of Patent: Feb. 17, 1987

[54] BI-DIRECTIONAL OVERTRAVEL STOP

[75] Inventors: Jeffrey D. Metcalf, Rockford; Gary D. Gillingham, Cherry Valley, both of Ill.

[73] Assignee: Sundstrand Corporation, Rockford, Ill.

[21] Appl. No.: 804,388

[22] Filed: Dec. 4, 1985

[51] Int. Cl.⁴ ............................................. F16D 11/00
[52] U.S. Cl. ..................................... 192/141; 192/144
[58] Field of Search .............. 192/141, 139, 138, 144, 192/7, 8 C, 8 R, 12 BA, 17 D; 74/411.5; 188/71.1, 72.8, 82.2, 82.9

[56] References Cited

U.S. PATENT DOCUMENTS

| | | | |
|---|---|---|---|
| 3,329,242 | 7/1967 | Minarick et al. | 192/7 X |
| 3,659,682 | 5/1972 | Meyer et al. | 192/8 C X |
| 3,898,817 | 8/1975 | Capewell et al. | 192/7 |
| 4,059,176 | 11/1977 | Lowery et al. | 192/17 D X |
| 4,064,981 | 12/1977 | House et al. | 192/141 |
| 4,372,432 | 2/1983 | Waine et al. | 192/8 C |
| 4,483,429 | 11/1984 | Tiedeman | 192/8 R |
| 4,579,201 | 4/1986 | Tiedeman | 192/144 X |
| 4,582,183 | 4/1986 | Kuroda | 192/144 X |

Primary Examiner—William F. Pate, III
Assistant Examiner—Creighton Smith
Attorney, Agent, or Firm—Wood, Dalton, Phillips, Mason & Rowe

[57] ABSTRACT

Rotational overtravel stops are often crucial components of actuators used in environments where not only cost but also power requirements, reliability, weight, size and simplicity are important. A bi-directional overtravel stop for a rotatable actuator shaft is disclosed which includes first and second brake plates secured for rotation with the shaft in opposite directions by a pair of oppositely disposed one-way clutches. A non-rotatable brake member is mounted for axial movement relative to the shaft and means are provided for biasing the brake member to frictionally engage one or the other of the brake plates when the shaft has reached the selected limit of its rotation in one direction or the other. The actuating structure of the overtravel stop includes a sleeve over the shaft and secured to the brake member, and a tubular threaded member over the sleeve, said threaded member and sleeve being secured against relative rotation and allowing telescoping relative to one another. Stops are provided so that, at either end of the telescoping motion, the sleeve is appropriately biased to move the brake member toward engagement with the appropriate brake plate. The threaded member is driven axially by a nut which is itself driven by the shaft. The one-way clutches are springs wound spirally around the shaft with one end of each spring being fixed to its associated brake plate.

20 Claims, 2 Drawing Figures

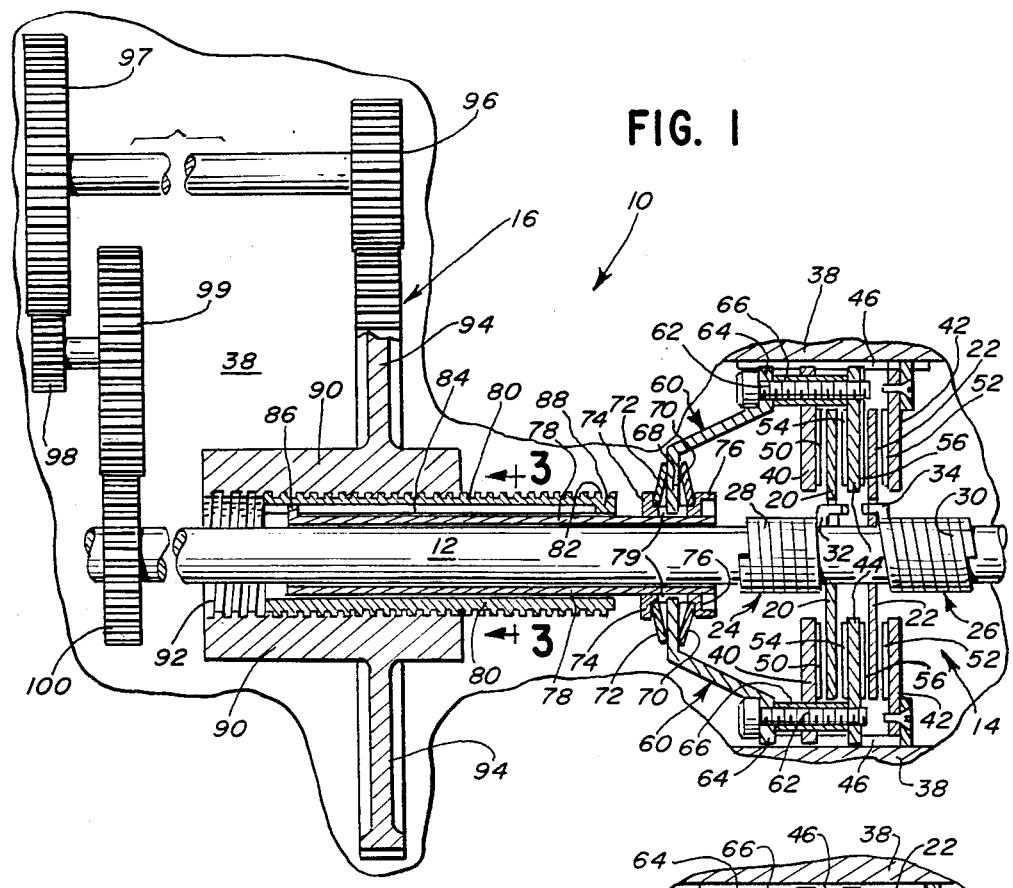
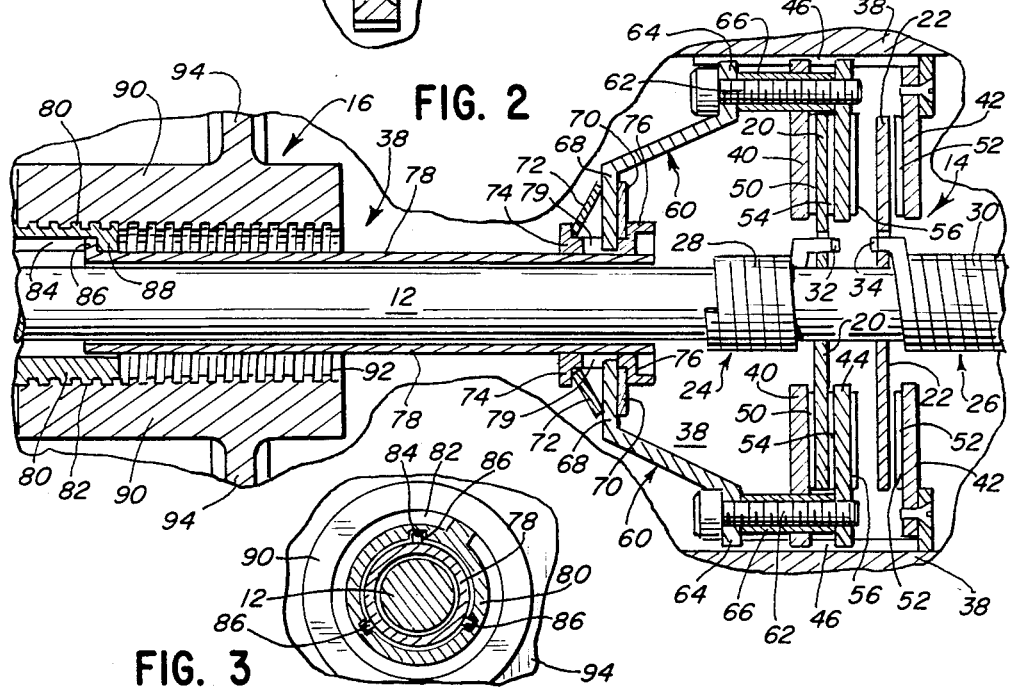

BI-DIRECTIONAL OVERTRAVEL STOP

DESCRIPTION

1. Technical Field

This invention relates to an overtravel stop, and more particularly to a bi-directional overtravel stop for use in limiting the rotation of an actuator. The actuator can be used for movement and positioning of aircraft components such as a flight control surface.

2. Background Art

Rotational overtravel stops are often crucial components of actuators used in environments where not only cost but also power requirements, reliability, weight, size and simplicity are important. For example, where rotating actuators are used to adjust the flaps of an airplane wing, the reliability of the overtravel stops are crucial in order to prevent possible structural damage and the possibility of the flaps being adjusted to an aerodynamically unstable position if there should be a failure in the primary control for the actuator. Simplicity is also important as it helps to ensure the reliability of the stops. Of course, weight, size and power requirements are also obviously important factors with such actuators.

A number of overtravel stops have been developed in the prior art, often in an attempt to meet these crucial needs. For example, Eastman U.S. Pat. No. 4,442,928 discloses an actuator in which overtravel is prevented by the engagement of stop teeth. Sears U.S. Pat. No. 3,029,660 discloses a similar stopping structure.

Hallden U.S. Pat. No. 2,854,113 and Hoover U.S. Pat. No. 3,221,118 disclose actuators which use electrical switches for limits, with limiting backup structures should those switches fail.

A difficulty often encountered by overtravel stops is that, once the actuator reaches its limit and is stopped, an exceptional amount of torque can be required to reverse the actuator away from the friction stop. This is a critically important problem where the actuator is driven (as they often are) by a high-speed, low-torque motor and size, weight, and cost limitations make it impractical to provide the additional motor which would be necessary to overcome the limiting frictional forces.

Some of the overtravel stops of the prior art have also recognized this problem. Henschke U.S. Pat. No. 3,327,826 discloses a structure in which a spring is provided to add energy to aid in reversing the actuator. Krell U.S. Pat. No. 2,620,911 and House et al U.S. Pat. No. 4,064,981 provide lost motion connections between the actuator and the stop structure to avoid the need for additional power to back the actuator away from its limit.

The above structures however have weight and size limitations, particularly where the number of rotations between the actuator limits are great. Further, the cost of these structures can be high. Still further, the adaptability of these structures to the requirements of different rotational limits for different actuator requirements is limited, and can necessitate the manufacture of a number of components usable with only a few actuators.

The present invention is directed toward overcoming one or more of the problems as set forth above.

DISCLOSURE OF THE INVENTION

In one aspect of the present invention, a bi-directional overtravel stop for a rotatable actuator shaft is disclosed which includes first and second brake plates secured for rotation with the shaft in opposite directions by a pair of oppositely disposed one-way clutches. A non-rotatable brake member is mounted for axial movement relative to the shaft and means are provided for biasing the brake member to frictionally engage one or the other of the brake plates when the shaft has reached the selected limit of its rotation in one direction or the other.

In another aspect of the present invention, the actuating structure of the overtravel stop includes a sleeve over the shaft and secured to the brake member, and a tubular threaded member over the sleeve, said threaded member and sleeve being secured against relative rotation and allowing telescoping relative to one another. Stops are provided so that, at either end of the telescoping motion, the sleeve is appropriately biased to move the brake member toward engagement with the appropriate brake plate. In a related aspect of the present invention, the threaded member is driven axially by a nut which is itself driven by the shaft.

In yet another aspect of the present invention, the one-way clutches are springs wound spirally around the shaft with one end of each spring being fixed to its associated brake plate.

The above invention allows actuators to be equipped with inexpensive overtravel stops having minimal weight and size. The above-described overtravel stops are also simple and highly reliable. Further, the above-described overtravel stops allow the actuators to be reversed from their limits without requiring any additional power/torque. Still further, overtravel stops constructed according to the above invention are readily adaptable for use with different actuators, and for use in limiting different ranges of travel.

BRIEF DESCRIPTION OF THE DRAWINGS

FIG. 1 is a cross-sectional view of one embodiment of the present invention;

FIG. 2 is an enlarged cross-sectional view showing a portion of the present invention in one of its limiting positions; and FIG. 3 is a cross-sectional view taken along line 3—3 of FIG. 1.

BEST MODE FOR CARRYING OUT THE INVENTION

The bi-directional overtravel stop 10 of the present invention is best shown in FIG. 1. The overtravel stop 10 is used to limit the rotation in either direction of a shaft 12 which might be used, for example, to adjust the flaps of an airplane wing.

The overtravel stop 10 includes two major components: a brake structure 14 and an actuating structure 16.

The brake structure 14 includes a pair of annular brake plates 20,22 disposed about the shaft 12 and connected thereto by one-way clutches 24,26. The clutches 24,26 connect the brake plates 20,22 respectively to the shaft 12 so as to associate one brake plate 20 with one direction of rotation of the shaft 12 and the other brake plate 22 with the other direction of rotation of the shaft 12.

As illustrated in the figures, the one-way clutches 24,26 are spiral springs 28,30 wound about the shaft 12 so as to be in frictional engagement therewith. One end 32,34 of each spring 28,30 respectively is secured to an associated brake plate 20,22, as by extension through an opening in the brake plate 20,22. As viewed from the secured ends 32,34, the springs 28,30 are wound in opposite directions about the shaft 12 in order to associate the brake plates 20,22 with opposite directions of shaft rotation as desired.

One-way clutches other than those illustrated in the figures might also be used within the scope of the present invention.

Suitably secured to the housing 38 on opposite sides of the brake plates 20,22 are a pair of rigid annular brake flanges 40,42. An axially reciprocating brake member 44 is located between the two brake plates 20,22 and is suitably fixed against rotation relative to the housing 38 and brake flanges 40,42 by, for example, the spline 46 shown.

It should be understood that, while reference will hereafter be made to components being "fixed against rotation", this is meant to refer to rotation relative to a base position of the shaft 12. Thus, should the shaft 12 requiring overtravel limits be in an environment (e.g. housing) which rotates together with the shaft 12 in some manner which does not shift the shaft 12 relative to its limits, the components which are "fixed against rotation" would, of course, also rotate with the environment.

Annular brake pads 50,52,54,56 are secured on one face of each brake flange 40,42 and on both sides of the brake member 44. These pads 50–56 ensure that appropriate frictional braking surfaces engage the brake plates 20,22 during overtravel braking.

The brake member 44 is actuated in its axial reciprocation through a suitable connection to the actuating structure 16, and specifically through a suitable connection to a plate 60 associated with the actuating structure 16. The connection shown comprises a number of screws 62 extending through openings in the plate rim 64 and one brake flange 40. Spacing sleeves 66 around the screws 62 are slidably received in the flange opening and serve to secure the brake member 44 at a selected distance from the rim 64 of the plate 60.

The plate rim 64 is also suitably fixed against rotation relative to the housing 38 by the spline 46.

The plate 60 includes an inner annular flange 68 fixed between a pair of Belleville washers 70,72. The Belleville washers 70,72 are mounted on shoulder members 74,76 suitably fixed to an axially reciprocable sleeve 78 located over the shaft 12. One of the shoulder members 74 acts also as a stop in the actuating structure 16 as will become apparent. A spline 79 defined between the shoulder members 74,76 secures the sleeve 78 against rotation relative to the plate 60. Still other connections between the plate 60 and sleeve 78 could be provided, though it should be understood that some axial flexibility between the actuating structure 16 and brake member 44 is desirable (as will become apparent).

It should also be understood that though the plate 60 is shown as a solid piece, cut-out sections could be used to reduce weight. Still further, a selected number of individual, disconnected arms might be used in place of the unitary plate 60 to provide a suitable connection between the sleeve 78 and brake member 44.

Located about the sleeve 78 is a tubular member 80 with outer threads 82. The tubular member 80 includes a spline connection to the sleeve 78 so that it too is fixed against rotation. As shown in the figures, the spline connection includes an axial slot 84 in the tubular member inner surface within which is received an ear or stop 86 on the sleeve 78. Three such slot 84/stop 86 pairs are shown in the embodiment illustrated (see FIG. 3), though any number of such pairs could be provided (preferably at equal spacing for reasons which will become apparent).

The tubular member 80 also includes an ear 88 at one end of each slot 84. These ears 88 (only one of which is seen in FIGS. 1 and 2) will engage the stops 86 of the sleeve 78 at one end of the tubular member's travel to prevent the tubular member 80 from telescoping completely off of the sleeve 78, and also to actuate the braking structure 14 as will become apparent.

A nut 90 is located over the tubular member 80 and includes inner threads 92 matching the tubular member outer threads 82. The nut 90 is secured against axial motion by suitable means (not shown).

The nut 90 includes a gear flange 94 thereabout which, through a number of gears 96,97,98,99, is driven by a gear 100 suitably secured to the shaft 12. It should be understood however that the gears 96–100 shown are merely an exemplary driving connection, and the exact ratio of the driving connection must be selected according to the number of revolutions allowed by the desired limits of shaft revolution versus the number of nut revolutions providing full axial travel of the tubular member 80. Further, it can be seen that changing of the rotational limits of the overtravel stop 10 can be easily accomplished by changing this gear structure.

INDUSTRIAL APPLICABILITY

Operation of the overtravel stop 10 will presently be described. During this discussion, references to clockwise and counterclockwise rotation will be as viewed from the left of FIGS. 1 and 2.

During counterclockwise rotation of the shaft 12 within its rotational limits, the gear flange 94 and thus nut 90 will, through gears 96–100, be driven in a clockwise direction of rotation. Since the tubular member 80 is prevented from rotating by its spline connection with the sleeve 78, clockwise rotation of the nut 90 causes the tubular member 80 to move to the left in FIG. 1.

When the shaft 12 approaches the selected limit of its travel in the counterclockwise direction, the ear 88 on the tubular member 80 will engage the stop 86 of the sleeve 78 (as shown in FIG. 2) and begin to pull the sleeve 78 also to the left.

Acting through the plate 60 and screws 62, the sleeve 78 causes the brake member 44 to move leftward also to squeeze the brake plate 20 against the braking flange 40. The brake pads 50,54 associated therewith thereby increase their frictional force on the brake plate 20 until, ultimately, it is stopped from rotating in the counterclockwise direction with the shaft 12.

Concurrently, as the brake plate 20 is slowed to a stop, the spring 28 is biased toward wrapping more tightly about the shaft 12 to similarly lock the shaft 12 and brake plate 20 together. Thus the shaft 12 is held against further counterclockwise rotation beyond this selected limit.

As is apparent from FIG. 2, the axial flexibility allowed by the Belleville washer 70 permits a small amount of lag to occur between when the brake pads 50,54 first engage the brake plate 20 and when the shaft 12 stops rotating. Such a lag is desirable to prevent abrupt locking, and also in view of the inherent lag involved in the one-way clutch 24/spring 28.

Reverse (i.e. clockwise) rotation of the shaft 12 away from this limit may then be readily accomplished without any additional torque needed to overcome the static friction forces limiting the counterclockwise rotation of the shaft 12. Specifically, when the shaft 12 is rotated clockwise, the spring 28 effectively unwinds from the shaft 12 and thereby permits the shaft 12 to rotate relative to the fixed brake plate 20. (As it unwinds, the spring 28 also decreases its frictional grip around the shaft 20 so that some slippage might also be allowed therebetween if necessary.) Ultimately, after a small amount of shaft rotation, the nut 90 will have backed off the actuating structure 16 sufficiently so that the brake member 44 will no longer bias the brake plate 20 against the brake flange 40, and the brake plate 20 will thus be free to rotate clockwise with the shaft 12.

Similar operation of the overtravel stop 10 occurs when the shaft 12 approaches the limits of its clockwise rotation. In that case, the ear 88 of the tubular member 80 is moving to the right and abuts the shoulder member/stop 74 on the sleeve 78 when it approaches the limit of clockwise rotation. The actuating structure 16 thus biases the brake member 44 toward the brake plate 22 and brake flange 42, frictionally braking the plate 22 and, through the spring 30, the shaft 12. In view of the opposite winding of the spring 30 relative to the other spring 28 (as viewed from their ends 34,32 respectively), the spring 30 functions to lock the brake plate 22 to the shaft 12 during clockwise rotation, but allows counterclockwise rotation of the shaft 12 away from its clockwise limit without requiring additional torque.

Other aspects, objects and advantages of this invention can be obtained from a study of the drawings, the specification and the appended claims.

We claim:

1. A bi-directional overtravel stop for a rotatable shaft comprising:
    first and second brake plates secured for rotation in first and second directions respectively with the shaft by a pair of oppositely disposed one-way clutches;
    a non-rotatable brake member mounted for axial movement relative to the shaft, wherein the brake member frictionally engages the first brake plate at one end of its movement and the second brake plate at the other end of its movement;
    means for biasing the brake member axially to said one end of its movement when the shaft has reached a selected limit of its rotation in the first direction; and
    means for biasing the brake member axially to said other end of its movement when the shaft has reached a selected limit of its rotation in the second direction.

2. The overtravel stop of claim 1, wherein the biasing means comprise:
    a threaded non-rotatable member drivably connected to the shaft for axial reciprocation therealong; and
    first and second stops secured relative to the brake member whereby said threaded member engages said first stop to bias the brake member toward the first brake plate at the selected limit of shaft rotation in the first direction, and said threaded member engages the second stop to bias the brake member toward the second brake plate at the selected limit of shaft rotation in the second direction.

3. The overtravel stop of claim 2, wherein the threaded member is tubular about the shaft and has outer threads, and further comprising:
    a sleeve secured to the brake member and extending about the shaft inside the threaded member, said stops being at opposite ends of said sleeve;
    a spline connection allowing axial motion between said threaded member and said sleeve; and
    a nut about said threaded member, said nut being driven at a selected ratio of the shaft rotation.

4. The overtravel stop of claim 3, wherein the sleeve is secured to the brake member to allow some axial play therebetween.

5. The overtravel stop of claim 4, wherein the sleeve is secured to the brake member by Belleville washers.

6. The overtravel stop of claim 3, further comprising an ear on said tubular member and adapted to engage either of said stops.

7. The overtravel stop of claim 1, wherein the brake member is between the brake plates, and further comprising fixed brake flanges on opposite sides of the brake plates whereby, at the selected limits of shaft rotation in the first and second directions, the first or second brake plate respectively is frictionally engaged between the brake member and one of the brake flanges.

8. The overtravel stop of claim 7, wherein the biasing means comprise:
    a threaded non-rotatable member drivably connected to the shaft for axial reciprocation therealong; and
    first and second stops secured relative to the brake member whereby said threaded member engages said first stop to bias the brake member toward the first brake plate at the selected limit of shaft rotation in the first direction, and said threaded member engages the second stop to bias the brake member toward the second brake plate at the selected limit of shaft rotation in the second direction.

9. The overtravel stop of claim 8, wherein the threaded member is tubular about the shaft and has outer threads, and further comprising:
    a sleeve secured to the brake member and extending about the shaft inside the threaded member, said stops being at opposite ends of said sleeve;
    a spline connection allowing axial motion between said threaded member and said sleeve; and
    a nut about said threaded member, said nut being driven at a selected ratio of the shaft rotation.

10. The overtravel stop of claim 1, wherein the one-way clutches are spiral springs wound around and frictionally engaging the shaft with one end of each spring being fixed to its associated brake plate, said springs being oppositely wound from their said one ends.

11. A bi-directional overtravel stop for a rotatable shaft, comprising:
    first and second oppositely disposed one-way clutches securing first and second brake plates respectively for rotation in a first or second direction respectively with the shaft;
    a brake member mounted for axial motion with respect to the shaft to frictionally engage either the first or second brake plates at selected limits of shaft rotation in the first and second directions respectively;
    a threaded member axially driven at a selected rate relative to shaft rotation; and
    an axially biasing connector secured to the brake member and including means for engaging said threaded member at the selected limits of shaft rotation in the first and second directions.

12. The overtravel stop of claim 11, wherein the one-way clutches are spiral springs wound around and frictionally engaging the shaft with one end of each spring being fixed to its associated brake plate, said springs being oppositely wound from their said one ends.

13. The overtravel stop of claim 11, wherein said engaging means comprises:
   an ear on the threaded member; and
   first and second stops on the connector, whereby the ear engages the first stop at the selected limit of shaft rotation in the first direction and engages the second stop at the selected limit of shaft rotation in the second direction.

14. The overtravel stop of claim 11, wherein the connector is disposed about the shaft and the threaded member is disposed about the connector with a spline connection therebetween allowing only relative axial motion.

15. The overtravel stop of claim 14, wherein a nut is disposed about the threaded member and is driven at a selected ratio of the shaft rotation to axially drive the threaded member.

16. The overtravel stop of claim 11, wherein the brake member is between the brake plates, and further comprising fixed brake flanges on opposite sides of the brake plates whereby, at the selected limits of shaft rotation in the first and second directions, the first or second brake plate respectively is frictionally engaged between the brake member and one of the brake flanges.

17. The overtravel stop of claim 11, wherein the connector is secured to the brake member to allow some axial play therebetween.

18. The overtravel stop of claim 17, wherein the connector is secured to the brake member by Belleville washers.

19. A bi-directional overtravel stop for a shaft rotatable in a housing, comprising:
   a non-rotatable sleeve supported for axial movement along the shaft;
   first and second axially spaced friction brake flanges located about the shaft and fixed relative to the housing;
   a friction brake member located between the brake flanges, said brake member being fixed to said sleeve and fixed against rotation relative to the brake flanges;
   a first brake plate located between the first brake flange and the brake member;
   a second brake plate located between the second brake flange and the brake member;
   a first one-way clutch connecting the first brake plate to the shaft for rotation in a first direction;
   a second one-way clutch connecting the second brake plate to the shaft for rotation in a second direction;
   a tubular member with an ear and outer threads, said tubular member being about said sleeve and having a spline connection therewith to prevent relative rotation therebetween;
   a nut engaging said tubular member threads, said nut being driven at a selected ratio of the shaft rotation to axially move said tubular member; and
   first and second stops on said sleeve, whereby said first stop is engaged by the ear to axially move said sleeve and brake member to frictionally engage said first brake plate between the first brake flange and the brake member when the shaft has reached a selected limit of its rotation in the first direction, and said second stop is engaged by the ear to axially move the sleeve and brake member to frictionally engage the second brake plate between the second brake flange and the brake member when the shaft has reached a selected limit of its rotation in the second direction.

20. The overtravel stop of claim 19, wherein the one-way clutches are spiral springs wound around and frictionally engaging the shaft with one end of each spring being fixed to its associated brake plate, said springs being oppositely wound from their said one ends.

* * * * *